Patented Dec. 24, 1946 … 2,413,176

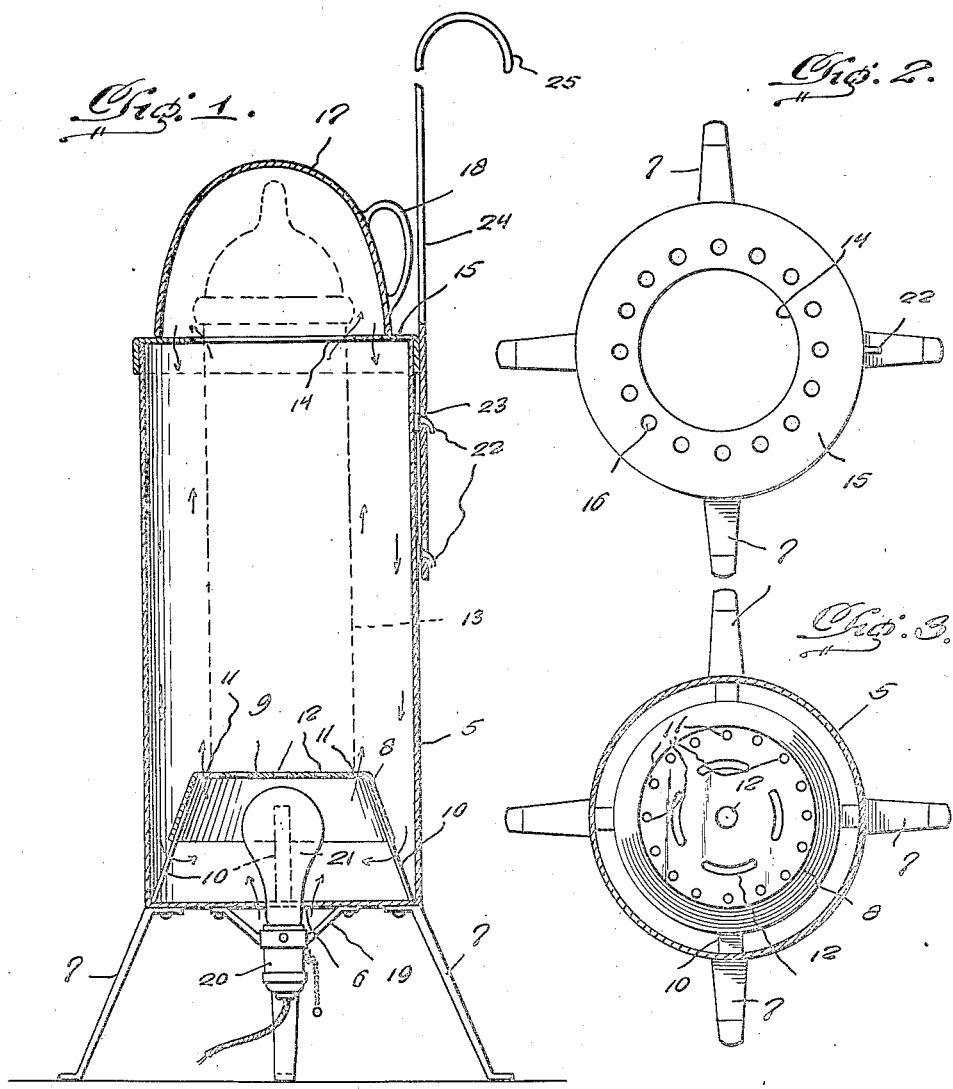

UNITED STATES PATENT OFFICE 2,413,176

MILK BOTTLE HEATER

Emsley T. Deaton, Brownsboro, Ala.

Application February 2, 1945, Serial No. 575,875

1 Claim. (Cl. 219—45)

The present invention relates to new and useful improvements in devices for heating milk bottles, and has for its primary object to provide means for utilizing a lamp bulb as the heating element for the bottles and also utilizing the heating means for illumination purposes while the bottle is being heated.

A further important object of the invention is to provide a bottle-heating device of this character by means of which the bottle may be easily and quickly heated to a desired temperature and in which the heat is evenly distributed throughout the entire area of the bottle without danger of scorching the milk contained therein so as to cause the milk to stick to the bottle.

A still further object of the invention is to provide a milk bottle heating device of this character which embodies a stand having means for mounting an electric light bulb therein for utilizing the same as the heating element, the stand being adapted for supporting on a table or other suitable article of furniture and also providing means by which the device may be attached to or suspended from the head of a bed within convenient reach of an attendant without necessitating the attendant leaving the bed while heating the bottle.

A still further object is to provide a bottle heating device of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1 is a vertical sectional view.

Figure 2 is a top plan view.

Figure 3 is a similar view with the top of the housing removed.

Referring now to the drawing in detail, wherein for the purpose of illustration I have disclosed a preferred embodiment of the invention, the numeral 5 designates a cylindrical container or housing having an opening 6 in the bottom thereof and supported in an elevated position by means of legs 7. The container 5 may be constructed of translucent plastic, or other suitable material.

A stand 8 is positioned in the container 5 and is composed of an inverted pan-like member 9 supported in an elevated position by means of legs 10. The top of the stand is formed with perforations 11 and including arcuate openings 12 adjacent the center of the stand and over which the bottom of a nursing bottle 13 is positioned for supporting the bottle on the stand in the container 5 and in spaced relation from the walls thereof, as indicated in Figure 1 of the drawing.

The upper end of the bottle projects upwardly beyond the top of the container 5 and projects upwardly through a central opening 14 formed in a cover 15 removably mounted on top of the container. The cover 15 is also formed with openings 16 to provide air inlet openings for the container.

The upwardly projecting end of the bottle 13 is enclosed within a dome or cup-shaped cover 17 arranged in inverted position and loosely resting on the cover 15. The cover 17 is formed with a handle 18 to facilitate handling thereof.

The bottom of the container 5 has secured thereto a bracket 19 in which a lamp socket 20 is secured for mounting an electric lamp 21 therein which projects upwardly through the opening 6 into the container 5 and under the stand 8.

Accordingly, when the lamp 21 is energized, the air within the container 5 will be heated and circulated around the outer sides of the bottle 13 as well as upwardly into the cover 17 for also heating or warming the top of the bottle and the nipple attached to the upper end thereof.

By constructing the container 5 of translucent material, the light from the lamp 21 will illuminate the room sufficiently to enable an attendant to place the bottle into the container 5 and remove the same therefrom as well as to perform other duties without the lamp shining directly on the baby.

One side of the container 5 is also provided with a pair of downwardly extending hooks 22 adapted for engaging openings 23 formed in the lower end of the rod 24 formed with a hook 25 at its upper end and adapted for hanging over a bedstead or other suitable structure so that the bottle may be placed within convenient reach of a person lying in the bed without necessitating leaving the bed for heating the bottle and feeding the baby. The rod 24 may be easily removed from the hook 22 when not in use.

The cover 17 covers the openings 16 in the top 15 of the container so that the air within the container is prevented from escaping and will thus become quickly heated and circulated about the entire surface of the bottle to evenly and quickly warm the contents thereof. There is not enough heat generated by the lamp 21 to cause an excessive heating of the air, thereby avoiding possibility of scorching the milk or causing it to stick to the bottle.

The stand 8 is removably mounted in the container and accordingly all parts of the device may be separated and thoroughly cleaned when desired.

In view of the foregoing description taken in conjunction with the accompanying drawing, it is believed that a clear understanding of the construction, operation and advantages of the device will be quite apparent to those skilled in the art. A more detailed description, therefore, is accordingly deemed unnecessary.

It is to be understood, however, that even I have herein shown and described a preferred embodiment of my invention, the same is susceptible to certain changes fully comprehended by the spirit of the invention as herein described, and the scope of the appended claim.

Having thus described the invention, what is claimed is:

A bottle heater comprising a translucent container having a centrally apertured lower end, an electric lamp mounted in the aperture of the lower end of the container, means supporting the container in raised position and affording access to the lamp, a milk bottle stand formed by the inverted bottom of an inverted frustum of a hollow cone supported above the lower end of the container and lamp, the container having an annular perforated top defining a central opening registering with the inverted bottom of the stand, downwardly bent hooks secured to the exterior of the container, hooked suspending means having apertures for the hooks and adapted for connection to the container, and a cover surrounding the perforations in the top of the container.

EMSLEY T. DEATON.